United States Patent [19]

Reichek

[11] Patent Number: 5,163,694
[45] Date of Patent: Nov. 17, 1992

[54] BUOYANT FISHING TACKLE SUPPORT

[76] Inventor: Michael E. Reichek, 3118 Battle Ridge La., Sugar Land, Tex. 77479

[21] Appl. No.: 754,757

[22] Filed: Sep. 4, 1991

[51] Int. Cl.$^5$ .............................................. B62B 1/20
[52] U.S. Cl. .................................. 280/47.26; 43/54.1; 280/79.2; 441/129
[58] Field of Search ................... 206/522, 523, 315.11, 206/560; 280/24, 79.2, 47.26; 114/344, 270; 43/54.1; 441/129, 136

[56] References Cited

U.S. PATENT DOCUMENTS

| | | |
|---|---|---|
| 3,678,611 | 7/1972 | Files . |
| 4,128,170 | 12/1978 | Elliott . |
| 4,500,059 | 2/1985 | Papizan . |
| 4,638,593 | 1/1987 | Garcia . |
| 4,671,008 | 6/1987 | Lindemood . |
| 4,681,219 | 7/1987 | Kitchens . |
| 4,794,723 | 1/1989 | Arnold et al. . |
| 4,815,761 | 3/1989 | Henderson ...................... 280/47.3 |
| 4,841,661 | 6/1989 | Moore . |
| 4,861,301 | 8/1989 | Pomeroy et al. . |
| 4,871,079 | 10/1989 | Doucette et al. . |
| 4,878,311 | 11/1989 | Cano . |
| 4,996,790 | 3/1991 | Ruggles . |
| 5,005,847 | 4/1991 | King et al. . |

Primary Examiner—Richard K. Seidel
Assistant Examiner—James Miner
Attorney, Agent, or Firm—Guy McClung

[57] ABSTRACT

Buoyant support for outdoor gear such as fishing, hunting, or archery equipment, the support in one aspect having a body member with one or more compartments for receiving and holding equipment and with one or more pairs of wheels attached to the body member to facilitate transportability; and sized, in one aspect to be suitable as a personal floatation device; in one aspect the support includes a box removably mounted on or in the body member, the box with or without a lid suitable for holding outdoor gear.

7 Claims, 4 Drawing Sheets

BUOYANT FISHING TACKLE SUPPORT

BACKGROUND OF THE INVENTION

1. Field of the Invention

The present invention is directed to a support for items, e.g. outdoor items and, in one particular aspect, to a buoyant support for fishing tackle, hunting gear, archery equipment, picnic items, bird watching gear, or scuba gear.

2. Description of Related Art

Many outdoor activities that people engage in require a variety of equipment and apparatuses. For example, a typical angler takes with her or him all sorts of tackle, nets, lures, rods, corks, tools, bait, and refreshments. Getting these things from one's vehicle to a pier, bank, or boat can be time-consuming and difficult. The task is made all the more onerous if the angler is going to be wade fishing either in fresh or saltwater, in bays and flats or in the surf. Other persons engaged in outdoor activities encounter similar problems in transporting or handling equipment.

U.S. Pat. No. 5,005,847 discloses a fishing caddy apparatus with a lower and upper tray and a pair of wheels facilitating transportability.

U.S. Pat. No. 4,996,790 discloses a buoyant bait bucket with a catamaran hull that permits water to flow through it and an upper portion with a variety of depressions for holding various items, e.g. a tackle box; and a bait holding part which can accommodate different types of bait.

U.S. Pat. No. 4,878,311 discloses a buoyant container for fishermen or women having a tubular frame with buoyant material therein, e.g. urethane foam, on which is mounted a flexible or rigid net material forming a basket or container. Rod holders are adhesively secured to the tubular frame.

U.S. Pat. No. 4,871,079 discloses a floating cooler chest which is an integral structure with a cavity filled with a buoyant material, e.g. foam, and a variety of recesses for holding items.

U.S. Pat. No. 4,861,301 discloses a personal floatation system that includes a buoyant support for a person and a haversack attachable to the support and for holding an item such as an ice chest.

U.S. Pat. No. 4,841,661 discloses a multi-compartment container for holding all sorts of fishing gear and other items such as hot or cold food and drinks and a flashlight.

U.S. Pat. No. 4,794,723 discloses a floating bait bucket with a buoyant ring, a compartment for bait, a tackle box, an insulated food area, and a rod holder.

U.S. Pat. No. 4,681,219 discloses a boat accessory with recesses for holding items of different size, e.g. pliers, containers, tackle, etc.

U.S. Pat. No. 4,671,008 discloses a buoyant tackle box with a hole therethrough leading to a net below the box into which fish can be inserted and in which they are held.

U.S. Pat. No. 4,638,593 discloses a boat-shaped floating fishing accessory with an enclosed hull with a live bait compartment and an insulated food compartment. A pair of tubular enclosed air chambers provide buoyancy and holes are provided for attaching a stringer. Other compartments are provided for additional items, e.g. tackle items.

U.S. Pat. No. 4,500,059 discloses a multi-recess, multi-compartment fishing seat tray.

U.S. Pat. No. 4,128,170 discloses a combination tackle box, bait holder, cooler, and seat.

U.S. Pat. No. 3,678,611 discloses a buoyant fishing tackle carrier with a variety of compartments for a variety of tackle.

There has long been a need for an easily transportable support for outdoor gear such as fishing gear. There has long been a need for such a support which has a simple construction yet is sufficiently buoyant. There has long been a need for such a support which is lightweight yet durable.

SUMMARY OF THE PRESENT INVENTION

The present invention discloses a buoyant support which, in one embodiment, has a main body member with one or more compartments or recesses therein or therethrough and one or more pairs of wheels for facilitating transportability. In one embodiment the support is made from a buoyant material such that it can serve as a life-saving floatation device. In one aspect such a support is useful for a fisherman or woman, particularly an angler who wades while fishing.

In another embodiment a support according to this invention is made from closed cell polyethylene material which can be easily molded or cut as desired and which permits the easy insertion of hooks, knives and other items, much like a pin cushion. Construction of this material also makes it easy for an angler (or other person) to customize a support by cutting out a recess, hole, or compartment of a desired size and configuration, e.g. to hold a tackle box, an insulated container, a rod holder, a can holder, net, bait container, or other items. By emplacing a box in one of the recesses, the support can be used to transport anything that can fit into the box. By providing one or more holes through the support's main body member, items such as a tether to an angler's belt or a line to a floating bait bucket can easily be tied to the support.

In another embodiment, a support according to the present invention includes a support as described herein with one or more containers or boxes, insulated or not, removably mounted on, through, or in the support.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF EMBODIMENTS PREFERRED AT THE TIME OF FILING FOR THIS PATENT

Figure 1:
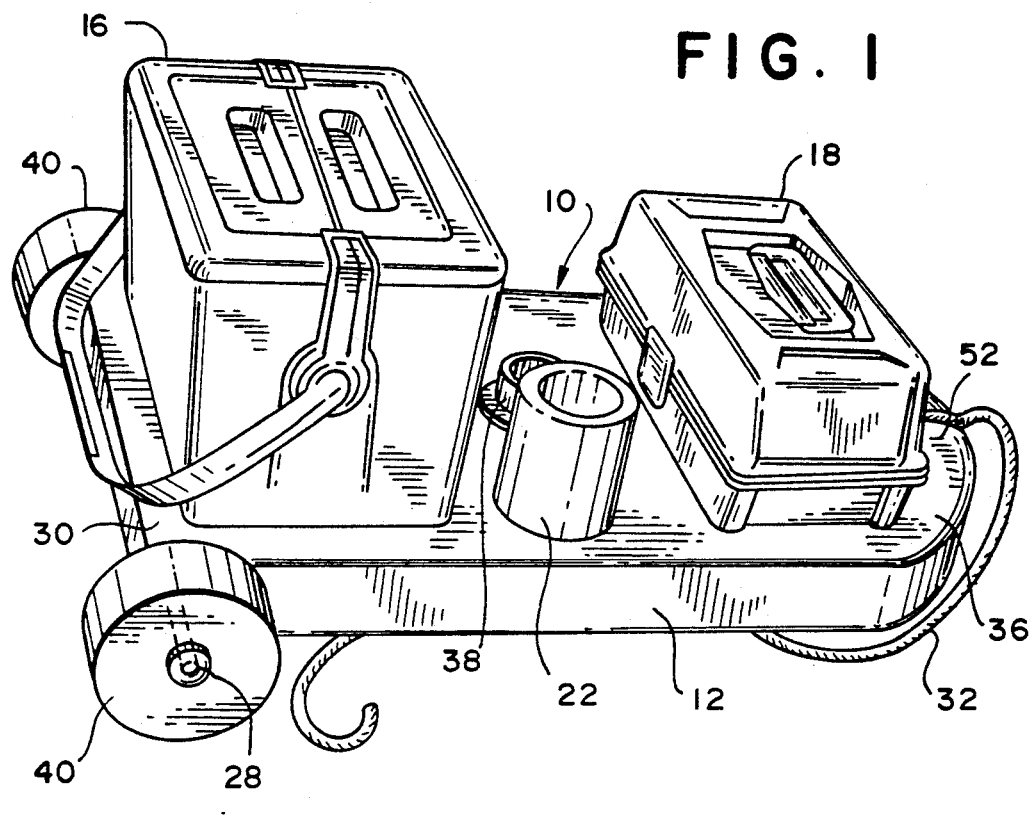
FIG. 1 is a side perspective view of a support according to the present invention.
Figure 2:
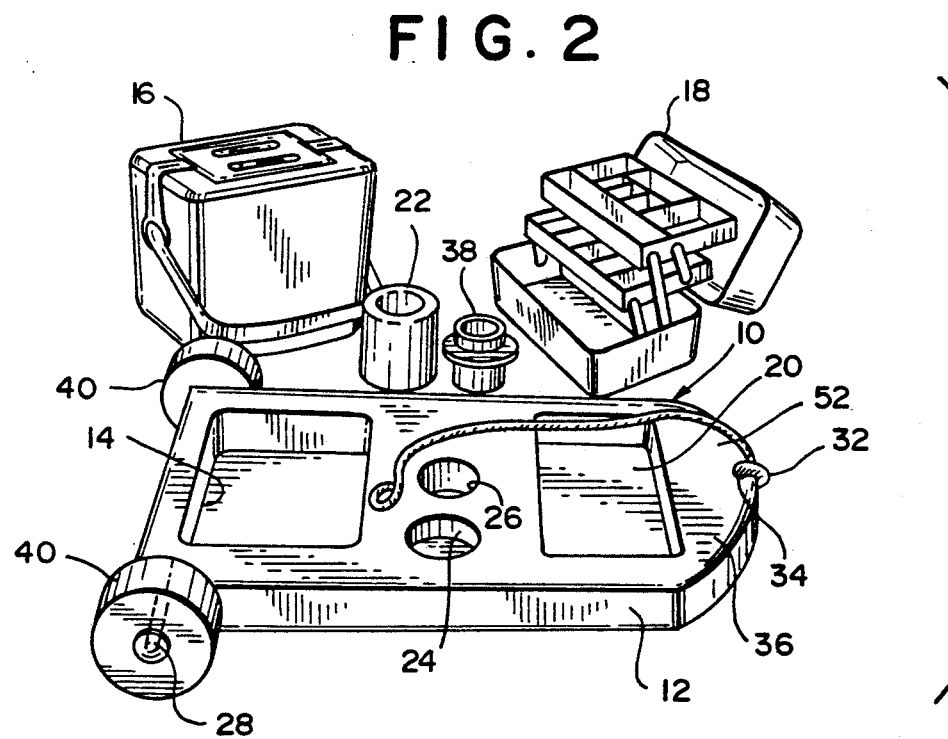
FIG. 2 is a side perspective view of the support of FIG. 1.

Referring now to FIGS. 1 and 2, a buoyant support 10 according to the present invention has a main body member 12 with a rectangular hole 14 therethrough for matingly holding an item of similar shape, e.g. an insulated chest 16. A box such as a fishing tackle box (or a box for holding e.g. tools, archery equipment, hunting gear) 18 is held in a recess 20 in the main body member. The box may have a lid, as shown, or it may be open without a lid. A can, bottle, or other circular item 22 is disposed in a circular recess 24 in the main body member and an item, e.g. a rod or a handle of a fishing net, can be inserted through a hole 26 in the main body member. An axle 28 extends through one end 30 of the main body member and two wheels 40 are rotatably attached to the axle, one on either side of the body member, to facilitate transportability of the support 10. A tether 32 is tied through a hole 34 in another end 36 of the main body member 12. A hollow insert 38 may be emplaced in the hole 26 to further support an item placed therein. As shown in FIG. 2, all of the items 16, 18, 22, and 38 are removably supported on or in the main body member 12. The items 16, 18, 22, or 38 may themselves be buoyant. An end 52 of the body member 12 is curved to facilitate movement of the support 10 through the water and, if necessary, to facilitate its use as a personal floatation device or kickboard in swimming.

Figure 3:
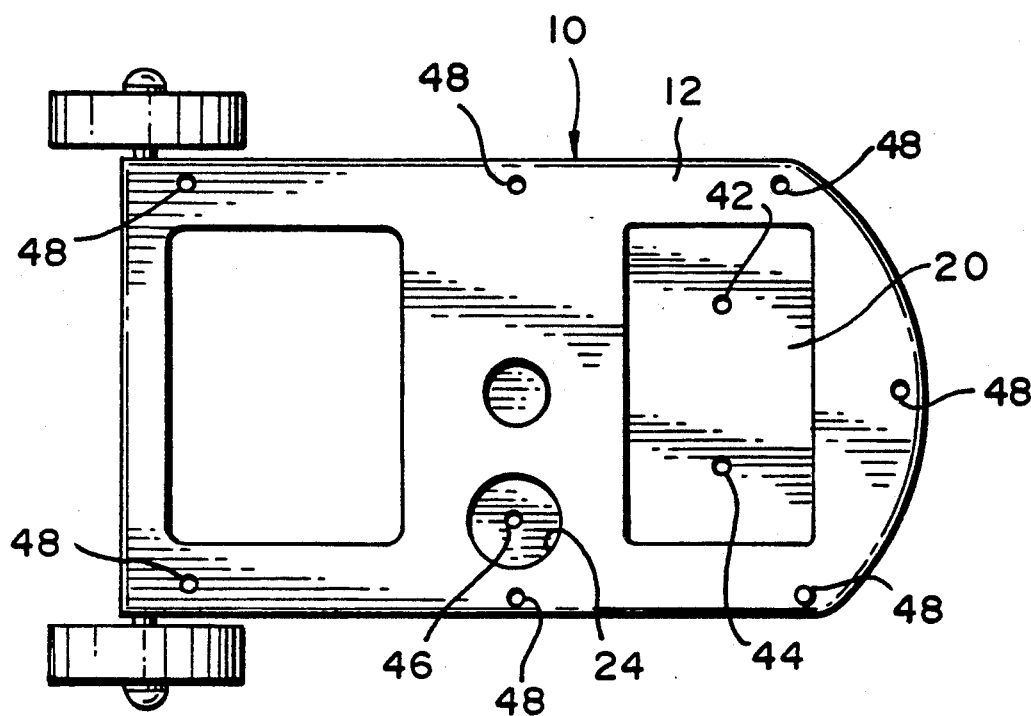
FIG. 3 is a top view of the support of FIG. 1.

FIG. 3 shows a top view of the support 10 and illustrates drain holes 42 and 44 in the recess 20 and a drain hole 46 in the recess 24. A plurality of holes 48 in the main body member 12 may be used to tie lines, ropes, etc. to the main body member 12.

Figure 4:
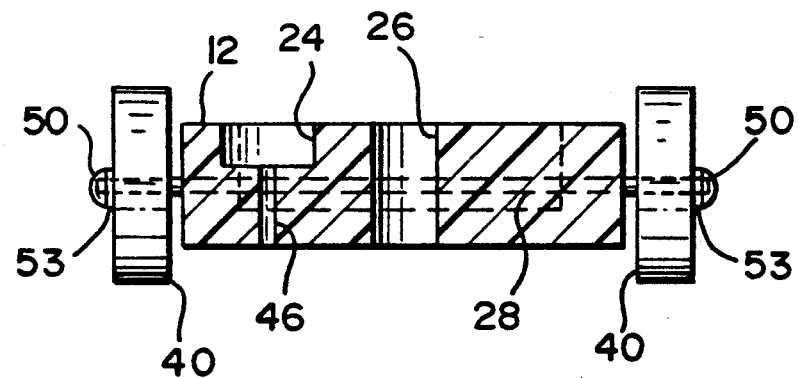
FIG. 4 is a rear view in cross-section of the support of FIG. 1.
Figure 5:
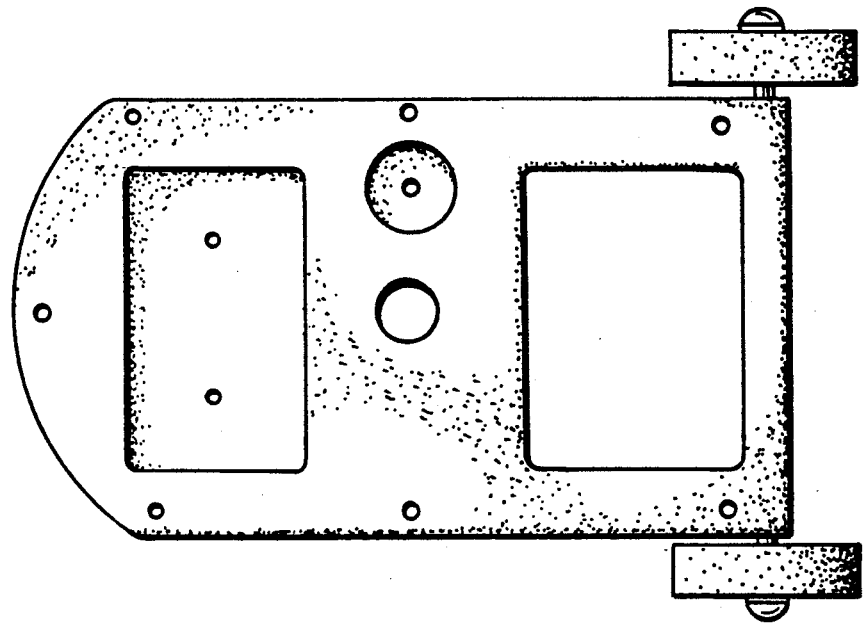
FIG. 5 is a top view of a support according to the present invention.
Figure 6:
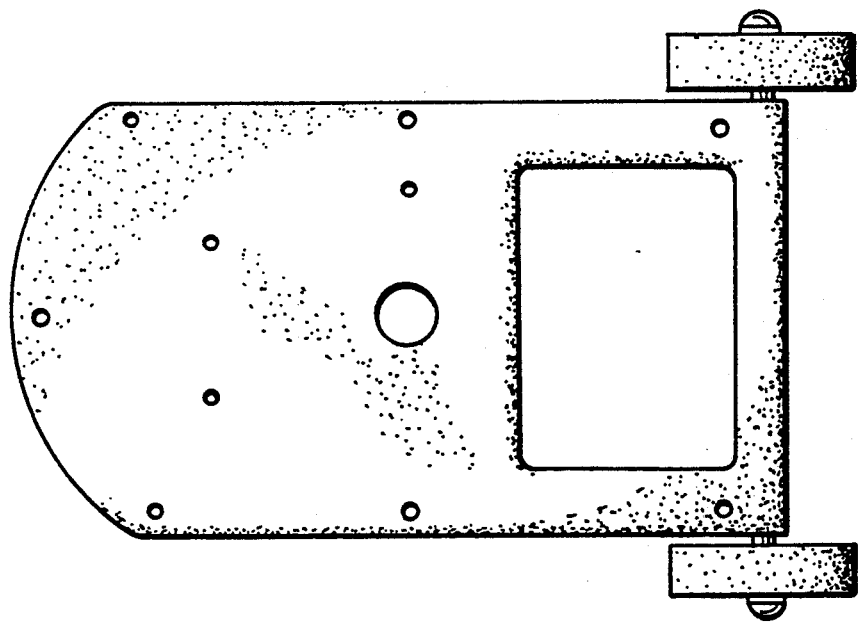
FIG. 6 is a bottom view of the support of FIG. 5.
Figure 7:
FIG. 7 is a left side view of the support of FIG. 5 (the right side view is a mirror image of this left side view).
Figure 8:
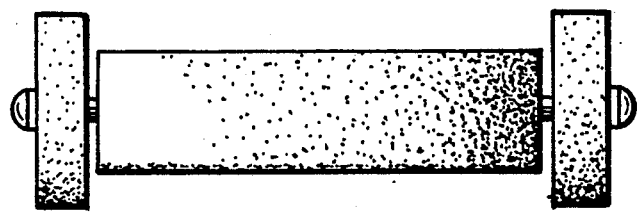
FIG. 8 is a front view of the support of FIG. 5.
Figure 9:
FIG. 9 is a rear view of the support of FIG. 5.

FIG. 4 illustrates a rear view of the support 10 in cross-section showing the axle 28 extending through the main body member 12 and the wheels 40 attached thereto. Stop caps 50 hold the wheels 40 on the axle 28. Spacers 53 promote rotation and reduce wear between the stop caps and wheels.

The photographs in FIGS. 5-9 show the design of one embodiment of a mount support according to the present invention, like the mount support 10 in FIGS. 1-4. As shown in FIGS. 5-9, the buoyant mount support is made, preferably, from a material into which items such as arrow points, knives, hooks, tools, etc. can be inserted without destroying the support and without adversely affecting its buoyancy. Although styrofoam if used carefully may suffice for this, it is preferred to use closed cell polyethylene. If in addition to the main body member the wheels and stop caps are also made from plastic and the axle is made from wood or plastic, there will be no part of the support that is subject to rust.

A support as shown in FIGS. 5-9 is about 30 inches long, 16 inches wide and 2 inches thick. This support can support an average person in the water and thus can be used as a personal floatation device.

Although one pair of wheels is preferred, an additional pair (or more) may be used on the body member.

In conclusion, therefore, it is seen that the present invention and the embodiments disclosed herein are well adapted to carry out the objectives and obtain the ends set forth at the outset. Certain changes can be made in the apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A buoyant support for outdoor equipment, the support comprising
   an exposed buoyant body member having a top and a bottom and made from a material into which pointed items are easily insertable and a material which is easily cut to form a recess for a particular item, at least one recess in the body member for receiving and holding an item of outdoor equipment, the recess having a top and a bottom and at least one drain hole extending from the bottom of the recess to the bottom of the body member, and
   at least one pair of wheels rotatably mounted to the body member for facilitating transportability of the buoyant support.

2. The buoyant support of claim 1 including at least one hole therethrough for receiving and holding a rod-shaped handle of an item.

3. The buoyant support of claim 1 wherein the material of the buoyant body member is closed cell polyethylene.

4. The buoyant support of claim 1 comprising also
   at least one buoyant box removably mounted in a recess in the buoyant body member.

5. The buoyant support of claim 1 wherein the outdoor equipment is fishing gear and includes a fishing tackle box and the buoyant body member has a recess therein for receiving and matingly holding the fishing tackle box.

6. The buoyant support of claim 1 wherein an end of the buoyant body member is curved to facilitate movement of the support through the water.

7. A buoyant personal flotation support, the support comprising
   an exposed buoyant body member having a top and a bottom and made from closed cell polyethylene into which pointed items are easily insertable and which is easily cut to fashion a recess therein, the buoyant body member having a curved end to facilitate movement of the support through the water, at least one compartment in the body member for receiving and holding an item of fishing equipment, the compartment comprising a recess in a top of the body member and at least one drain hole extending from a bottom of the recess to a bottom of the body member, at least one pair of wheels rotatably mounted on an axle extending through an end of the body member for facilitating transportability of the buoyant support, at least one hole through the body member for holding a rod-shaped handle of a fishing rod of an item, at least one tie-hole through the buoyant body member for typing a line to the support, and at least one box removably mounted in a recess in the buoyant body member.

* * * * *